June 5, 1962
M. BOYER
3,037,342
SICKLE BAR
Filed Dec. 16, 1959
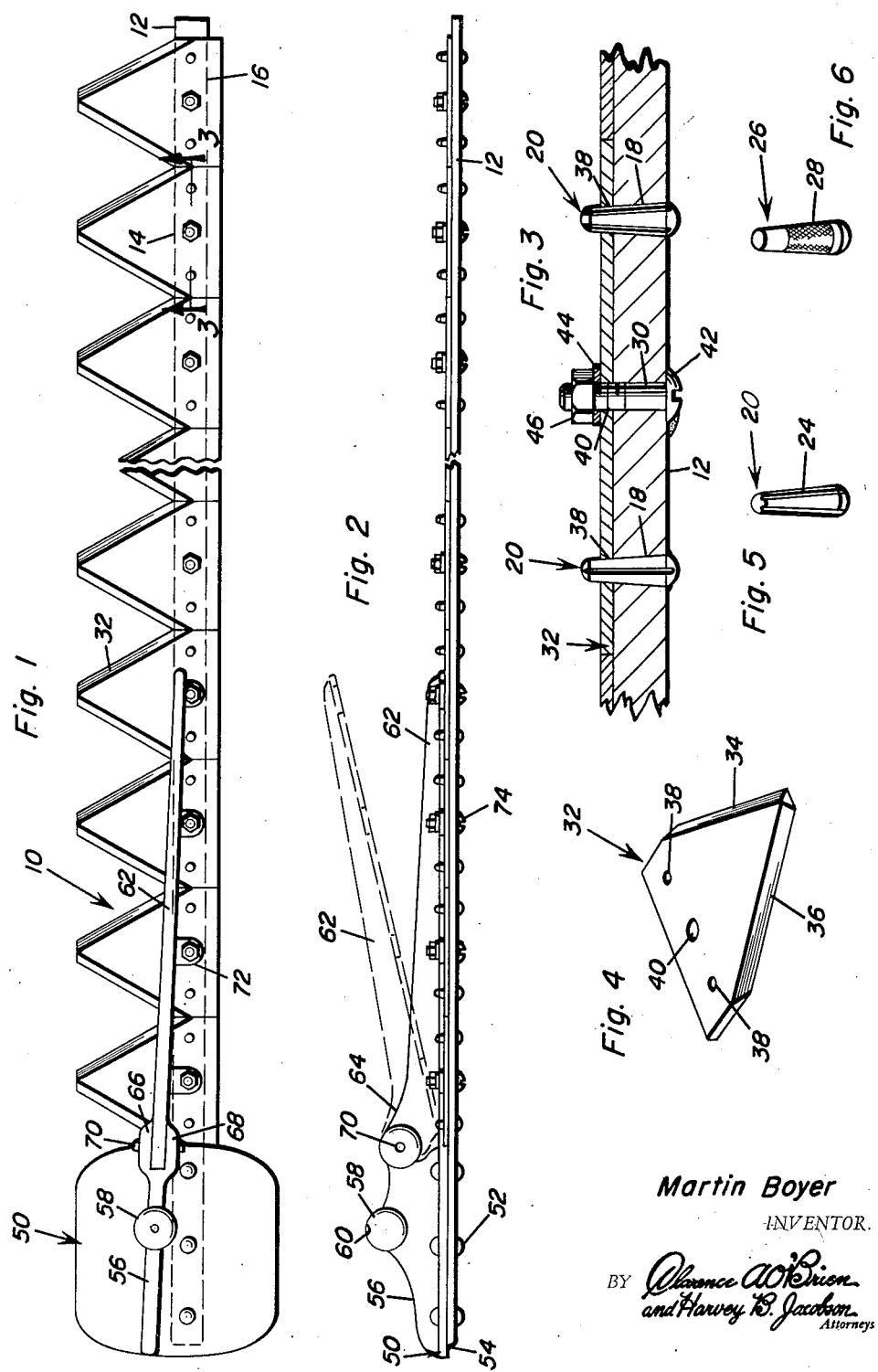
Martin Boyer
INVENTOR.

United States Patent Office 3,037,342
Patented June 5, 1962

3,037,342
SICKLE BAR
Martin Boyer, Box 24, Lowry, Minn.
Filed Dec. 16, 1959, Ser. No. 859,866
4 Claims. (Cl. 56—296)

This invention relates generally to cutting equipment and more particularly to a reciprocating sickle bar construction of the type utilized in mowing and reaping machinery.

The present invention represents an improvement over the applicant's earlier device forming the subject matter of U.S. Patent 2,332,840 issued on October 26, 1943.

Difficulty has often been encountered by farmers and machinists in removing old or broken blades from a retaining bar. Numerous devices have been developed and form the subject matter of various patents for the purpose of facilitating the removal of sickle blades. Particular difficulty is associated with the removal of the sickle blades which are inaccessibly positioned below the head or attaching plate which attaches the sickle blade to the reciprocating pitman. In the light of these recognized difficulties and disadvantages of presently known devices, the applicant has herein disclosed an improved sickle bar construction wherein blades may be easily removed from the retaining bar and replaced securely with a minimum of effort. Further, means are provided for facilitating the removal of the sickle blades beneath the head or attaching plate.

It is a further object of this invention to provide a novel sickle bar construction wherein the blades are securely held by the retaining bar so as to prevent displacement, twisting and strain, and other deleterious effects, but which nevertheless includes means for quickly and selectively removing and replacing the blades without utilizing special tools or requiring the services of a skilled person. It is more particularly an object of this invention to provide a novel sickle bar construction which introduces advantages not heretofore known in the art but which remains relatively inexpensive to manufacture and utilize.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational top plan view of the sickle bar construction illustrating it detached from machinery with which use is contemplated;

FIGURE 2 is a front elevational view of the sickle bar construction illustrated in dotted line position, how the web extension forming part of the sickle bar construction may be raised so as to gain access to the sickle blades secured immediately therebeneath;

FIGURE 3 is an enlarged vertical sectional view taken substantially along the plane 3—3 of FIGURE 1;

FIGURE 4 is a perspective view illustrating the details of a sickle blade;

FIGURE 5 is a front elevational view illustrating a grooved tapered pin which may be utilized to secure the sickle blades to the retaining bar; and FIGURE 6 is a knurled tapered pin which also may be utilized to secure a sickle blade to the retaining bar.

With continuing reference to the drawings, numeral 10 generally represents the sickle bar construction including a retaining bar 12 having parallel forward and rearward edges 14 and 16 respectively. The retaining bar 12 is provided with a first set of apertures 18 through which tapered pins 20 are driven. The pins 20 are rounded on either end thereof and extend above and below the retaining bar 12 as is particularly illustrated in FIGURE 3.

It is contemplated that the tapered pins 20 be one of two types. The first type of tapered pin 20 is shown in FIGURES 3 and 5 and is provided with longitudinal grooves 24 extending the length thereof. The second type of tapered pin 26 is shown in FIGURE 6 and is provided with a knurled circumferential surface 28 in lieu of the grooves 24. Either of the tapered pins 20 or 26 may be driven through the apertures 18 in the retaining bar 12. It is contemplated that the pins 20 be force-fit in the retaining bar 12 so as to permanently secure them therein.

The retaining bar 12 is further provided with a second set of apertures 30. Each of the apertures 30 is formed intermediate a pair of the apertures 18. Sickle blades particularly illustrated in FIGURE 4 and designated as 32 are provided with a pair of cutting edges 34 and 36. Spaced openings 38 are formed in the sickle blade with the spacing therebetween equal to the spacing between the apertures of the first set in the retaining bar. A central hole 40 is formed intermediate the spaced openings 38. In order to secure the sickle blade 32 to the retaining bar 12, the sickle blade 32 is superposed on the retaining bar with the extending pins 20 passing through the openings 38. The central hole 40 is thereby registered with the aperture 30. A bolt 42 is then inserted through the aperture 30 and central hole 40 with a washer 44 being received thereon. A nut 46 preferably brass is then utilized to firmly secure the sickle blade 32 to the retaining bar 12. It will therefore be noted that the sickle blade 32 is securely fastened to the retaining bar 12 and is prevented from turning relative thereto inasmuch as it is fixed at three points. In order to remove a particular sickle blade from the retaining bar, it is merely necessary to loosen and remove the appropriate nut and lift the sickle blade from the retaining bar 12. It is preferable to spot weld the bolts 42 to the underside of the retaining bar 12 as shown in FIGURE 3.

In order to utilize the sickle bar for cutting, it is necessary to operatively connect the bar to a reciprocating pitman. For this purpose, a ball and socket connection is generally utilized. An attachment plate or flange illustrated at 50 is superposed on the retaining bar 12 at one end thereof. Rivets 52 and a spot-weld 54 serve to secure the attachment plate 50 to the retaining bar 12. Formed with the attachment plate 50 is an upstanding rib 56 having an enlarged ball 58 formed as a part thereof. The ball 58 is received in an appropriate socket on the pitman arm to operatively connect the retaining bar to the pitman. An oil hole 60 may be provided on the ball 58. Generally, the rib 56 extends a considerable length along the retaining bar 12 so as to render the blades immediately therebeneath inaccessible. It is one of the primary objects of this invention to modify existing devices so as to provide easy accessibility to the blades beneath a rib extension. For this purpose, a rib extension 62 is provided which is pivotally associated with the rib 56 by having an end portion 64 received between the bifurcated ends 66 and 68 of the rib 56. A pivot pin 70 extends through the bifurcated end of the rib 56 and pivotally secures the rib extension 62 thereto. The rib extension 62 is provided with apertured lugs 72 which fall into alignment with the second set of apertures 30 in the retaining bar 12 and the central holes 40 of the sickle blades 32. Accordingly, bolts 74 may be passed through the registered retaining bar aperture 30, sickle bar central hole 40 and apertured lug 72. It will be realized that the bolts 74 must be longer than the bolts 42 inasmuch as the thickness of the apertured lug 72 must be considered. It will therefore be seen that the rib extension 62 may be pivoted between a first position, as illustrated in solid lines in FIGURE 2, which lies adjacent and parallel to the retaining bar 12 to a second position illustrated in dotted lines. In order to remove sickle blades 32 from immediately below the rib extension, it is merely necessary to remove the bolts 74 and pivot the rib extension 62 away from the retaining bar 12 into a position perpendicular thereto about pivot pin 70. The sickle blades 32 therebeneath may then be removed in the same manner as any of the various other blades.

From the foregoing, it will be appreciated that the applicant has provided a novel sickle bar construction wherein all of the blades may be easily removed from the retaining bar and particularly wherein the blades immediately beneath the attachment means may be removed in an easy and improved manner.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. A reciprocating type sickle bar for mowing machines comprising a bar member and a plurality of cutter blades arranged along said bar member, each of said blades having at least three openings therein, and said bar member having a plurality of groups of three permanently attached studs therealong, the studs of each group removably inserted in the openings of each blade, the center stud only having a threaded nut thereon whereby each blade may be separately attached and removed from said bar member.

2. A sickle bar as defined in claim 1 wherein said bar has a plurality of bores therethrough in alignment with the openings in said blades, the two studs of each of said groups on each side of said center stud comprising tapered pins each having a small end and a large end, the large end of each pin being force fitted into one of said bores and the small end of each pin extending into one of said openings.

3. A sickle bar as defined in claim 2 wherein said center stud comprises a bolt extending through one of said bores in said bar, said bolt having a head welded to said bar.

4. A sickle bar as defined in claim 1 wherein an upstanding rib is fixed to one end of said bar, a rib extension pivotally connected to said rib whereby said extension may be pivoted towards and away from said blades and studs, lugs on said extension having apertures each adapted to receive one of the threaded studs whereby said lugs may be engaged by some of said nuts for rigidly securing said extension to said bar.

References Cited in the file of this patent
UNITED STATES PATENTS

| | | |
|---|---|---|
| 729,386 | Muller | May 26, 1903 |
| 2,216,790 | Sebade | Oct. 8, 1940 |
| 2,223,871 | Johnson | Dec. 3, 1940 |
| 2,332,840 | Boyer | Oct. 26, 1943 |
| 2,718,700 | Stecher | Sept. 27, 1955 |